(12) United States Patent
Abellan et al.

(10) Patent No.: US 10,670,768 B2
(45) Date of Patent: Jun. 2, 2020

(54) DETERMINING STANDOFF BETWEEN A WALL OF A WELLBORE AND A TOOL DISPOSED IN THE WELLBORE

(71) Applicant: Schlumberger Technology Corporation, Sugar Land, TX (US)

(72) Inventors: Alexandre Abellan, Clamart (FR); Emmanuel Legendre, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 46 days.

(21) Appl. No.: 15/972,265

(22) Filed: May 7, 2018

(65) Prior Publication Data
US 2018/0252840 A1  Sep. 6, 2018

Related U.S. Application Data

(63) Continuation-in-part of application No. 15/502,929, filed as application No. PCT/EP2015/001623 on Aug. 6, 2015, now Pat. No. 10,502,859.

(30) Foreign Application Priority Data

Aug. 11, 2014 (EP) .................................... 14290248

(51) Int. Cl.
*G01V 3/38* (2006.01)
*E21B 47/026* (2006.01)
(Continued)

(52) U.S. Cl.
CPC .............. *G01V 3/38* (2013.01); *E21B 47/026* (2013.01); *E21B 47/12* (2013.01); *E21B 49/005* (2013.01); *G01V 3/24* (2013.01); *G01V 3/088* (2013.01)

(58) Field of Classification Search
CPC ....................................................... G01V 3/38
See application file for complete search history.

(56) References Cited

U.S. PATENT DOCUMENTS 3,973,181 A  8/1976  Calvert
5,703,773 A  12/1997 Tabarovsky et al.
(Continued)

OTHER PUBLICATIONS

International Search Report and Written opinion issued in International application PCT/EP2015/001623 dated May 11, 2015. 12 pages.

(Continued)

*Primary Examiner* — Manuel A Rivera Vargas

(57) ABSTRACT

Apparatus and methods operable to determine between a wall of a wellbore penetrating in a subterranean formation and a resistivity tool disposed in the wellbore. One such method includes using an apparent impedance function depending on a frequency variable and a plurality of unknown parameters, at least one of the unknown parameters depending on a formation impedance of the subterranean formation. The method also includes applying a voltage, at each of a plurality of frequency values, between electrodes of a resistivity tool that is disposed in the wellbore. The method also includes measuring, across the electrodes, a plurality of apparent impedance values, each corresponding to a different one of the frequency values. The method still further includes determining the unknown parameters based on the frequency values and the apparent impedance values, and estimating the standoff distance based on an expression that includes at least one of the unknown parameters.

19 Claims, 6 Drawing Sheets

(51) Int. Cl.
    *G01V 3/24*       (2006.01)
    *E21B 49/00*     (2006.01)
    *E21B 47/12*     (2012.01)
    *G01V 3/08*       (2006.01)

(56) References Cited

U.S. PATENT DOCUMENTS

| | | |
|---|---|---|
| 7,394,258 B2 | 7/2008 | Itskovich et al. |
| RE42,493 E | 6/2011 | Tabarovsky et al. |
| 8,633,701 B2 | 1/2014 | Itskovich et al. |
| 2003/0155925 A1 | 8/2003 | Tabarovsky et al. |
| 2010/0023268 A1 | 1/2010 | Gold et al. |
| 2011/0025335 A1 | 2/2011 | Itskovich et al. |
| 2012/0119744 A1* | 5/2012 | Habashy .................. G01V 3/20 324/339 |
| 2012/0209527 A1 | 8/2012 | Gorek et al. |
| 2012/0265442 A1 | 10/2012 | Zhao |
| 2014/0191762 A1 | 7/2014 | Chen et al. |
| 2017/0227666 A1 | 8/2017 | Legendre et al. |

OTHER PUBLICATIONS

International Preliminary Report on Patentability issued in International application PCT/EP2015/001623 dated Feb. 14, 2017. 9 pages.
Search Report R. 62 issued in European Patent Application 14290248.5 dated Feb. 5, 2015. 8 pages.
Office Action issued in U.S. Appl. No. 15/502,929 dated Mar. 28, 2019, 8 pages.

* cited by examiner

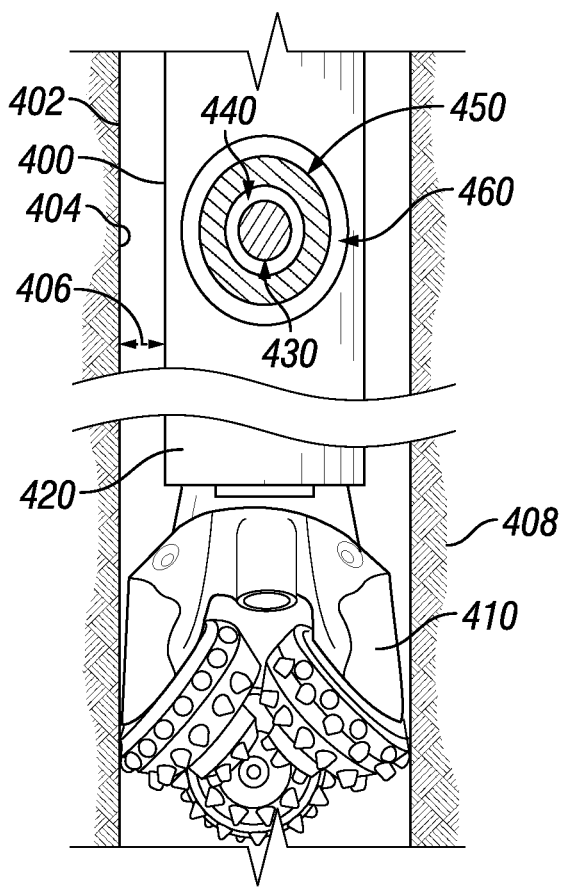
FIG. 4
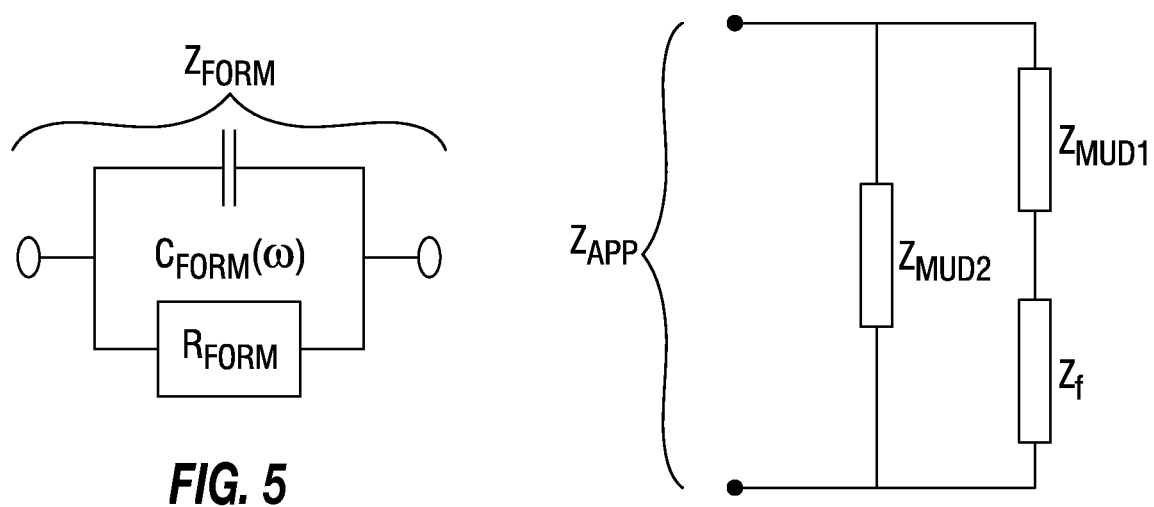
FIG. 5
FIG. 6

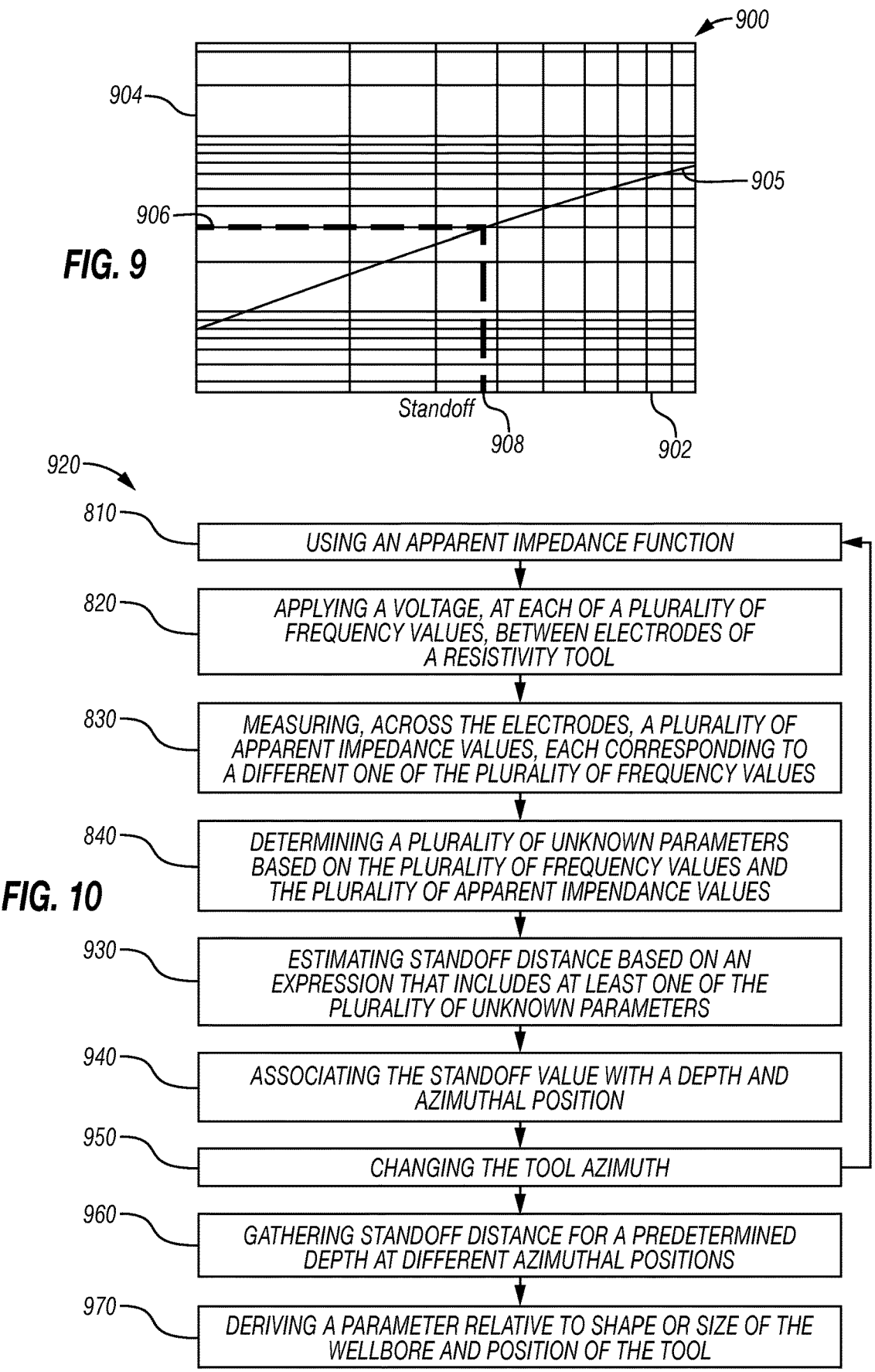

DETERMINING STANDOFF BETWEEN A WALL OF A WELLBORE AND A TOOL DISPOSED IN THE WELLBORE

BACKGROUND OF THE DISCLOSURE

In the exploration and production of hydrocarbons, it is desirable that the properties of the subterranean formation, such as resistivity of the subterranean formation surrounding a wellbore, be detected. Resistivity tools measure a wellbore resistivity, and the resistivity measurements may then be utilized to obtain a wellbore wall image. When measuring the micro-resistivity of a low-resistivity subterranean formation surrounding a wellbore, an unknown standoff distance between the resistivity tool and the surrounding subterranean formation can lead to errors in estimating the resistivity of the surrounding subterranean formation. Such errors may be exacerbated with the larger standoffs associated with some tools that are operable for continuous acquisition of formation resistivity data.

Electrical wellbore imaging revolves around using an adequate operating frequency so that an impedance of the mud in the wellbore is sufficiently reduced, thereby allowing measurement of the formation resistivity. A challenge remains with respect to removing the mud contribution from the measurement especially when the mud is an oil-based mud, which is very resistive. Various processing techniques have been proposed to remove the mud contribution from the measurement. These methods are based on approximating a formation impedance measurement by an equivalent circuit including an impedance in series. The aforementioned technique, however, has limited applicability to smaller standoff distances and/or poor resolution of sensing formation impedance with a conductive pad in series with a current-sensing circuit element.

SUMMARY OF THE DISCLOSURE

The present disclosure introduces a method for determining a resistivity of a subterranean formation surrounding a wellbore. In one embodiment, the method includes using an apparent impedance function depending on a frequency variable and a plurality of unknown parameters, at least one of the unknown parameters depending on a formation impedance of the subterranean formation, so that the apparent impedance function is non-linear relative to the formation impedance. The method also includes applying a voltage, at each of a plurality of frequency values, between electrodes of a resistivity tool that is disposed in the wellbore. The method also includes measuring, across the electrodes, a plurality of apparent impedance values, each corresponding to a different one of the frequency values. The method still further includes determining the unknown parameters based on the frequency values and the apparent impedance values, and estimating the formation resistivity based on an expression that includes at least one of the unknown parameters.

It also introduces a method for estimating a standoff distance between standoff distance between a wall of a wellbore penetrating a subterranean formation and a resistivity tool disposed in the wellbore. In one embodiment, the method includes using an apparent impedance function depending on a frequency variable and a plurality of unknown parameters, at least one of the unknown parameters depending on a formation impedance of the subterranean formation, so that the apparent impedance function is non-linear relative to the formation impedance. The method also includes applying a voltage, at each of a plurality of frequency values, between electrodes of a resistivity tool that is disposed in the wellbore. The method also includes measuring, across the electrodes, a plurality of apparent impedance values, each corresponding to a different one of the frequency values. The method still further includes determining the unknown parameters based on the frequency values and the apparent impedance values, and estimating the standoff distance based on an expression that includes at least one of the unknown parameters.

The present disclosure also introduces an apparatus for estimating a formation resistivity of a subterranean formation penetrated by a wellbore comprising a resistivity tool and a processing system. The resistivity tool comprises external electrodes and operable within the wellbore to apply a voltage, at each of a plurality of frequency values, between the electrodes, and measure, across the electrodes, a plurality of apparent impedance values, each corresponding to a different one of the plurality of frequency values. The at least one of the resistivity tool and the processing system is operable to use an apparent impedance function depending on a frequency variable and on a plurality of unknown parameters, at least one of the unknown parameters depending on a formation impedance of the subterranean formation, so that the apparent impedance function is non-linear relatively to the formation impedance, determine the plurality of unknown parameters based on the plurality of frequency values and the plurality of apparent impedance values, and estimate the formation resistivity based on an expression that includes at least one of the plurality of unknown parameters.

It also introduces an apparatus for estimating a standoff distance between a wall of a wellbore penetrating a subterranean formation and a downhole tool, wherein the apparatus includes a resistivity tool included in the downhole tool and a processing system. The resistivity tool comprises external electrodes and operable within the wellbore to apply a voltage, at each of a plurality of frequency values, between the electrodes, and measure, across the electrodes, a plurality of apparent impedance values, each corresponding to a different one of the plurality of frequency values. The at least one of the resistivity tool and the processing system is operable to use an apparent impedance function depending on a frequency variable and on a plurality of unknown parameters, at least one of the unknown parameters depending on a formation impedance of the subterranean formation, so that the apparent impedance function is non-linear relatively to the formation impedance, determine the plurality of unknown parameters based on the plurality of frequency values and the plurality of apparent impedance values, and estimate the standoff distance based on an expression that includes at least one of the plurality of unknown parameters. The expression is a first expression while the expression for determining the formation resistivity may be a second expression.

The present disclosure also introduces a computer program comprising machine-readable instructions for using an apparent impedance function depending on a frequency variable and on a plurality of unknown parameters, at least one of the unknown parameters depending on an impedance of the subterranean formation, so that the apparent impedance function is non-linear relative to the formation impedance. On the basis of a plurality of measured apparent impedance values each corresponding to a different one of a plurality of frequency values, the computer program comprising machine-readable instructions determines the plurality of unknown parameters, and estimates the formation resistivity based on an expression that includes at least one of the plurality of unknown parameters. The present disclosure also introduces a computer readable storage medium for storing the computer program.

It also introduces a computer program comprising machine-readable instructions for receiving a plurality of measured apparent impedance values (Zapp1, Zapp2, Zapp3) each corresponding to a different one of a plurality of frequency values ($\omega 1$, $\omega 2$, $\omega 3$) from a resistivity tool disposed in a wellbore penetrating a subterranean formation, and using an apparent impedance function depending on a frequency variable and on a plurality of unknown parameters, at least one of the unknown parameters depending on an impedance of the subterranean formation, so that the apparent impedance function is non-linear relative to the formation impedance. On the basis of a plurality of measured apparent impedance values each corresponding to a different one of a plurality of frequency values, the computer program comprising machine-readable instructions determines the plurality of unknown parameters, and estimates the standoff distance based on an expression that includes at least one of the plurality of unknown parameters. The expression is a first expression while the expression for determining the formation resistivity may be a second expression. The present disclosure also introduces a computer readable storage medium for storing the computer program.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 is a side view of at least a portion of apparatus according to one or more aspects of the present disclosure.

FIG. 5 is a circuit diagram of a model representing an impedance of a subterranean formation surrounding a wellbore according to one of more aspects of the present disclosure.

FIG. 6 is a block diagram of a model representing an apparent impedance of a fluid in a wellbore and a subterranean formation surrounding the wellbore according to one of more aspects of the present disclosure.

FIG. 9 is a graphical representation of a correlation function between an expression determined via the method according to one or more aspects of the present disclosure and a standoff distance.

FIG. 10 is a flow-chart diagram of at least a portion of a method according to one or more aspects of the present disclosure

DETAILED DESCRIPTION

Figure 1:
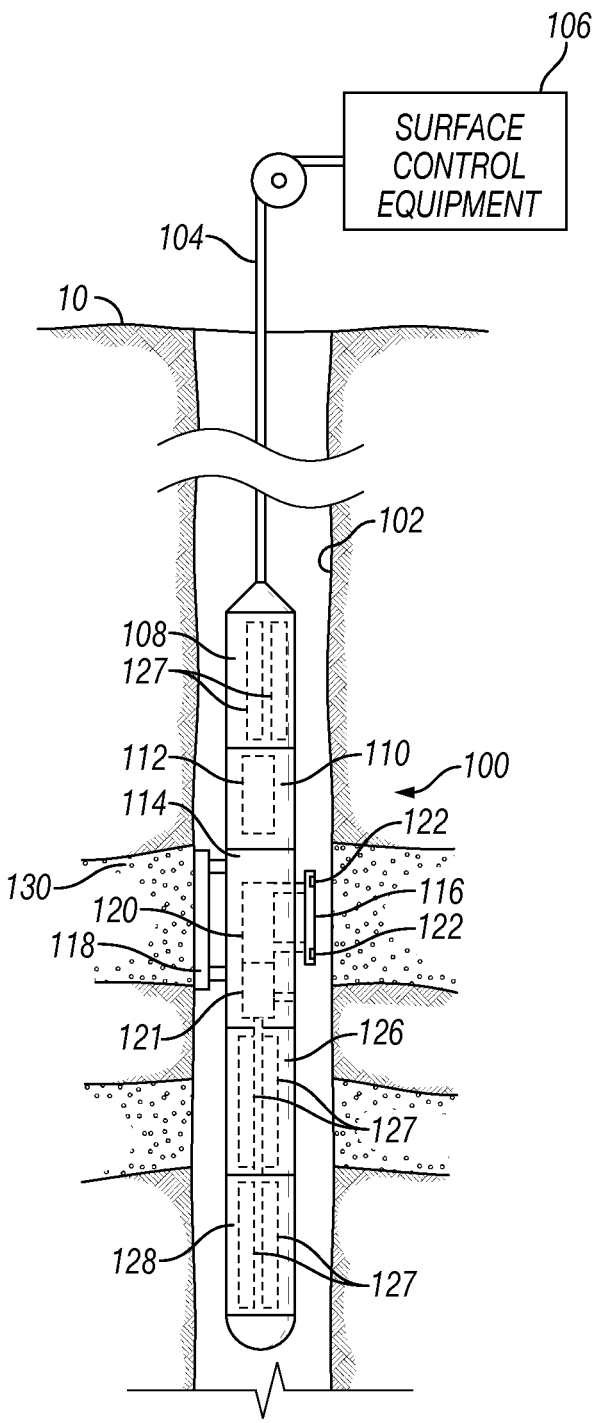
FIG. 1 is a schematic view of at least a portion of apparatus according to one or more aspects of the present disclosure.

It should be noted that, in the development of an actual implementation within the scope of the present disclosure, numerous implementation-specific decisions may be made to achieve a predetermined goals, such as compliance with system- and business-related constraints, which may vary from one implementation to another. However, a person having ordinary skill in the art will appreciate that such development may be complex and time consuming, but would nevertheless be a routine undertaking for those of ordinary skill in the art having the benefit of the present disclosure.

Example implementations within the scope of the present disclosure are described below with reference to the accompanying drawings. Numerous details are set forth below to provide a more thorough understanding of various aspects of the present disclosure. However, a person having ordinary skill in the art will appreciate that the example implementations disclosed herein may be practiced without some of these details. In other instances, well-known features may not be described in detail, such as may avoid complicating the following description.

Various terminology and phraseology are used herein for descriptive purposes, and thus may not be limiting in scope. Language such as "including," "comprising," "having," "containing," and "involving," and variations thereof, is intended to be broad and encompass the subject matter listed thereafter, equivalents, and additional subject matter not explicitly recited.

In addition, the present disclosure may repeat reference numerals and/or letters in the various example implementations. This repetition is for simplicity and clarity, and does not in itself dictate a relationship between the various implementations, embodiments, and/or configurations described below.

Implementations within the scope of the present disclosure may relate generally, but not by way of limitation, to an apparatus and method for measuring a resistivity of a subterranean formation (also referred to as "formation resistivity") surrounding a wellbore and to an apparatus and method for measuring a standoff distance between a tool disposed in the wellbore and a wall of the wellbore. The methods and apparatus according to the present disclosure also enable to perform both a determination of the standoff distance and the formation resistivity using the same model and the same measurement, which enables to obtain a maximum of information in real-time.

FIG. 1 is a schematic view of at least a portion of apparatus according to one or more aspects of the present disclosure. The apparatus may be utilized at a well site, which may be situated onshore or offshore. The apparatus comprises a downhole tool 100 operable to engage a portion of a wall of a wellbore 102 penetrating a subterranean formation 130.

The downhole tool 100 may be suspended in the wellbore 102 from a lower end of a multi-conductor cable 104 that may be spooled on a winch (not shown) at the wellsite surface 10. The cable 104 may be communicatively coupled to surface equipment, such as surface control equipment 106. The surface control equipment 106 may comprise a controller having an interface operable to receive commands from a surface operator. The surface control equipment 106 may further comprise a processor operable to implement one or more aspects of the methods described herein.

The downhole tool 100 may comprise a telemetry module 110, a formation test module 114 and a sample module 126. Although the telemetry module 110 is shown as being implemented separate from the formation test module 114, the telemetry module 110 may be implemented in the formation test module 114 and/or another module of the downhole tool 100. The downhole tool 100 may also comprise additional components at various locations, such as a module 108 above the telemetry module 110 and/or a module 128 below the sample module 126, which may have varying functionality within the scope of the present disclosure.

The formation test module 114 may comprise a probe assembly 116, which may be selectively extendable away from the downhole tool 100. The formation test module 114 may also comprise a selectively extendable anchoring member 118 arranged on an opposing side of the downhole tool 100 relative to the probe assembly 116. The probe assembly 116 may be operable to selectively seal off or isolate selected portions of the wall of the wellbore 102. For example, the probe assembly 116 may comprise a sealing pad that may be urged against the wall of the wellbore 102 in a sealing manner to prevent movement of fluid into or out of the subterranean formation 130 other than through the probe assembly 116. The probe assembly 116 may thus be operable to fluidly couple a pump 121 and/or other components of the formation test module 114 to the adjacent subterranean formation 130. Accordingly, the formation test module 114 may be utilized to obtain fluid samples from the subterranean formation 130 by extracting fluid from the subterranean formation 130 using the pump 121. A fluid sample may thereafter be expelled through a port (not shown) into the wellbore 102, or the sample may be directed to one or more detachable chambers 127 disposed in the sample module 126. In turn, the detachable chambers 127 may receive and retain the formation fluid for subsequent testing at surface or a testing facility. The detachable chambers 127 may be certified for highway and/or other transportation. The module 108 and/or the module 128 may comprise additional detachable chambers 127, which may also be detachable and/or certified for highway and/or other transportation.

The formation test module 114 may also be utilized to inject fluid into the subterranean formation 130 by, for example, pumping fluid from one or more fluid collecting chambers disposed in the sample module 126 via the pump 121. Moreover, while the downhole tool 100 is depicted as including one pump 121, it may also comprise multiple pumps. The pump 121 and/or other pumps of the downhole tool 100 may also comprise a reversible pump configured to pump in two directions (e.g., into and out of the subterranean formation 130, into and out of the detachable chambers 127 of the sample module 126, etc.). Example implementations of the pump 121 are described below.

The probe assembly 116 may comprise one or more sensors 122 adjacent a port of the probe assembly 116, among other possible locations. The sensors 122 may be configured to determine petrophysical parameters of a portion of the subterranean formation 130 proximate the probe assembly 116. For example, the sensors 122 may be configured to measure or detect one or more of pressure, temperature, composition, resistivity, dielectric constant, magnetic resonance relaxation time, nuclear radiation, and/or combinations thereof, although other types of sensors are also within the scope of the present disclosure.

The formation test module 114 may also comprise a fluid sensing unit 120 through which obtained fluid samples may flow, such as to measure properties and/or composition data of the sampled fluid. For example, the fluid sensing unit 120 may comprise one or more of a spectrometer, a fluorescence sensor, an optical fluid analyzer, a density and/or viscosity sensor, and/or a pressure and/or temperature sensor, among others.

The telemetry module 110 and/or another portion of the downhole tool 100 may comprise a downhole controller and/or control system 112 communicatively coupled to the surface control equipment 106. The surface control equipment 106 and/or the downhole controller and/or control system 112 may be operable to control the probe assembly 116 and/or the extraction of fluid samples from the subterranean formation 130, such as via the pumping rate of the pump 121. The surface control equipment 106 and/or the downhole controller and/or control system 112 may be further operable to analyze and/or process data obtained from sensors disposed in the fluid sensing unit 120 and/or the sensors 122, store measurements or processed data, and/or communicate measurements or processed data to surface or another component for subsequent analysis.

One or more of the modules of the downhole tool 100 depicted in FIG. 1 may be substantially similar to and/or otherwise have one or more aspects in common with corresponding modules and/or components shown in other figures and/or discussed herein. For example, one or more aspects of the formation test module 114 and/or the sample module 126 may be substantially similar to one or more aspects of a fluid communication module 234 and/or a sample module 236, respectively, which are described below in reference to FIG. 2.

Figure 2:
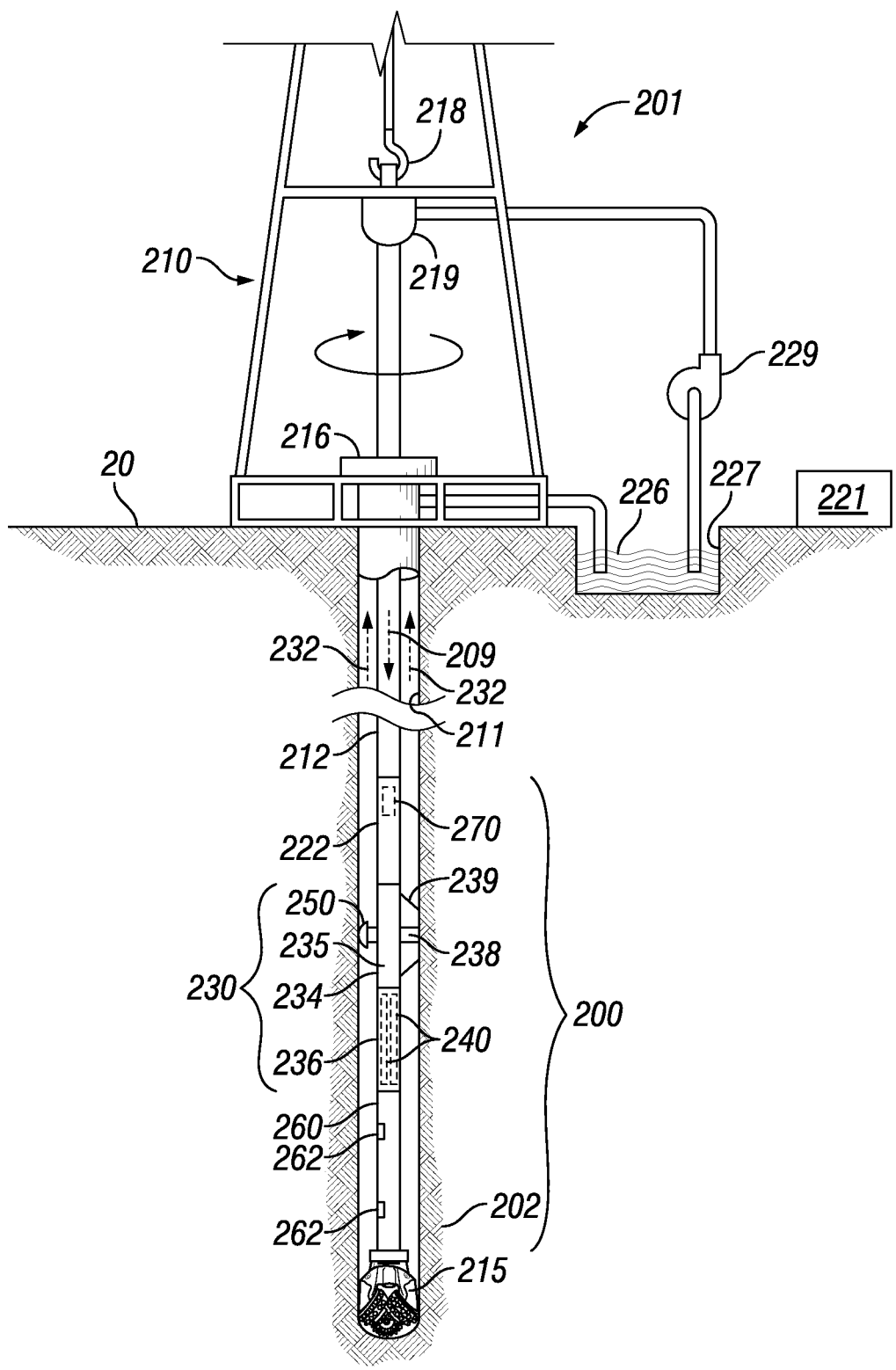
FIG. 2 is a schematic view of at least a portion of apparatus according to one or more aspects of the present disclosure.

FIG. 2 is a schematic view of at least a portion of apparatus according to one or more aspects of the present disclosure. Depicted components at wellsite 201 comprise a rig 210 and a downhole tool 200 suspended from the rig 210 within a wellbore 211 via a drill string 212. The downhole tool 200, or a bottom hole assembly ("BHA") including the downhole tool 200, comprises or is coupled to a drill bit 215 at a lower end that is used to advance the downhole tool 200 into a subterranean formation 202 and form the wellbore 211. The drill string 212 may be rotated by a rotary table 216 that engages a kelly at the upper end of the drill string 212. The drill string 212 is suspended from a hook 218, attached to a traveling block (not shown), through the kelly and a rotary swivel 219 that permits rotation of the drill string 212 relative to the hook 218. A top-drive may also be utilized to rotate and raise/lower the drill string 212, whether instead of or in addition to the kelly/rotary table 216.

The rig 210 is depicted as a land-based platform and derrick assembly utilized to form the wellbore 211 by rotary drilling in a manner that is well known. A person having ordinary skill in the art will appreciate, however, that one or more aspects of the present disclosure may also find application in other downhole applications, such as rotary drilling, and is not limited to land-based rigs.

Drilling fluid 226 is stored in a pit 227 formed at the wellsite 201. The drilling fluid 226 may be an oil-base drilling fluid and/or other mud emulsion having a nonaqueous fluid as the external/continuous phase. However, one or more aspects of the present disclosure may also be applicable or readily adaptable to implementations in which the drilling fluid 226 is a water-base drilling fluid.

A pump 229 delivers the drilling fluid 226 to the interior of the drill string 212 via a port in the rotary swivel 219, for example, such that the drilling fluid 226 flows downward through the drill string 212, as indicated in FIG. 2 by directional arrow 209. The drilling fluid 226 exits the drill string 212 via ports in the drill bit 215 (not shown), and then circulates upward through the annulus defined between the outside of the drill string 212 and the wall of the wellbore 211, as indicated by directional arrows 232. In this manner, the drilling fluid 226 lubricates the drill bit 215 and/or carries cuttings from the formation 202 up to the wellsite surface 20, where it is returned to the pit 227 for recirculation.

The downhole tool 200 comprises various components with various capabilities, such as measuring, processing, and storing information. A telemetry module 222 is also provided for communicating the associated data and/or control signals with surface equipment, such as surface control equipment 221, whether via mud-pulse telemetry, wireline, wired drill pipe, wireless communications (e.g., Wi-Fi, Bluetooth, etc.) and/or otherwise.

The downhole tool 200 also comprises a sampling while drilling ("SWD") system 230 comprising the fluid communication module 234 and the sample module 236, which may be individually or collectively housed in one or more drill collars for performing various formation evaluation and/or sampling functions. The fluid communication module 234 may be positioned adjacent the sample module 236, and may comprise one or more pumps 235, gauges, sensors, monitors and/or other devices that may also be utilized for downhole sampling and/or testing. The downhole tool 200 shown in FIG. 2 is depicted as having a modular construction with specific components in certain modules. However, the downhole tool 200 may be unitary, or select portions thereof may be modular. The modules and/or the components therein may be positioned in a variety of configurations throughout the downhole tool 200.

The fluid communication module 234 comprises a fluid communication device 238 that may be positioned in a stabilizer blade or rib 239. The fluid communication device 238 may be or comprise one or more probes, inlets and/or other means for receiving sampled fluid from the subterranean formation 202 and/or the wellbore 211. The fluid communication device 238 also comprises a flowline (not shown) extending into the downhole tool 200 for passing fluids therethrough. The fluid communication device 238 may be movable between extended and retracted positions for selectively engaging a wall of the wellbore 211 and acquiring one or more fluid samples from the subterranean formation 202. The fluid communication module 234 may also comprise a back-up piston 250 operable to assist in positioning the fluid communication device 227 against the wall of the wellbore 211.

The sample module 236 comprises one or more sample chambers 240. The sample chambers 240 may be detachable from the sample module 236 at surface, and may be certified for subsequent highway and/or other transportation.

The downhole tool 200 may also comprise a module 260 including sensors 262 operable to measure or detect characteristics of the wellbore 211 and/or the subterranean formation 202. For example, the sensors 262 may be operable to measure or detect one or more of pressure, temperature, composition, resistivity, dielectric constant, magnetic resonance relaxation time, nuclear radiation, and/or combinations thereof, although other types of sensors are also within the scope of the present disclosure.

The downhole tool 200 may also comprise a downhole controller and/or control system 270 operable to communicate with the surface control equipment 221. The downhole controller and/or control system 270 may be operable to control the telemetry module 222, the SWD system 230 and/or other modules, components and/or features, such as for the extraction of fluid samples from the subterranean formation 202. The surface control equipment 221 may also provide a source of AC power at a selectable (radian) frequency $\omega$ for performing resistivity measurements with the sensors 262 (e.g., including electrodes) of the module 260 (e.g., including a resistivity tool) of the downhole tool 200.

The tools 100, 200 have been described as comprising a plurality of modules (such as sampling while drilling, telemetry, etc.). However, the tools may have a much simpler configuration and may also comprise only a resistivity tool 400 as described in relationship with FIG. 4 without any additional modules.

Figure 3:
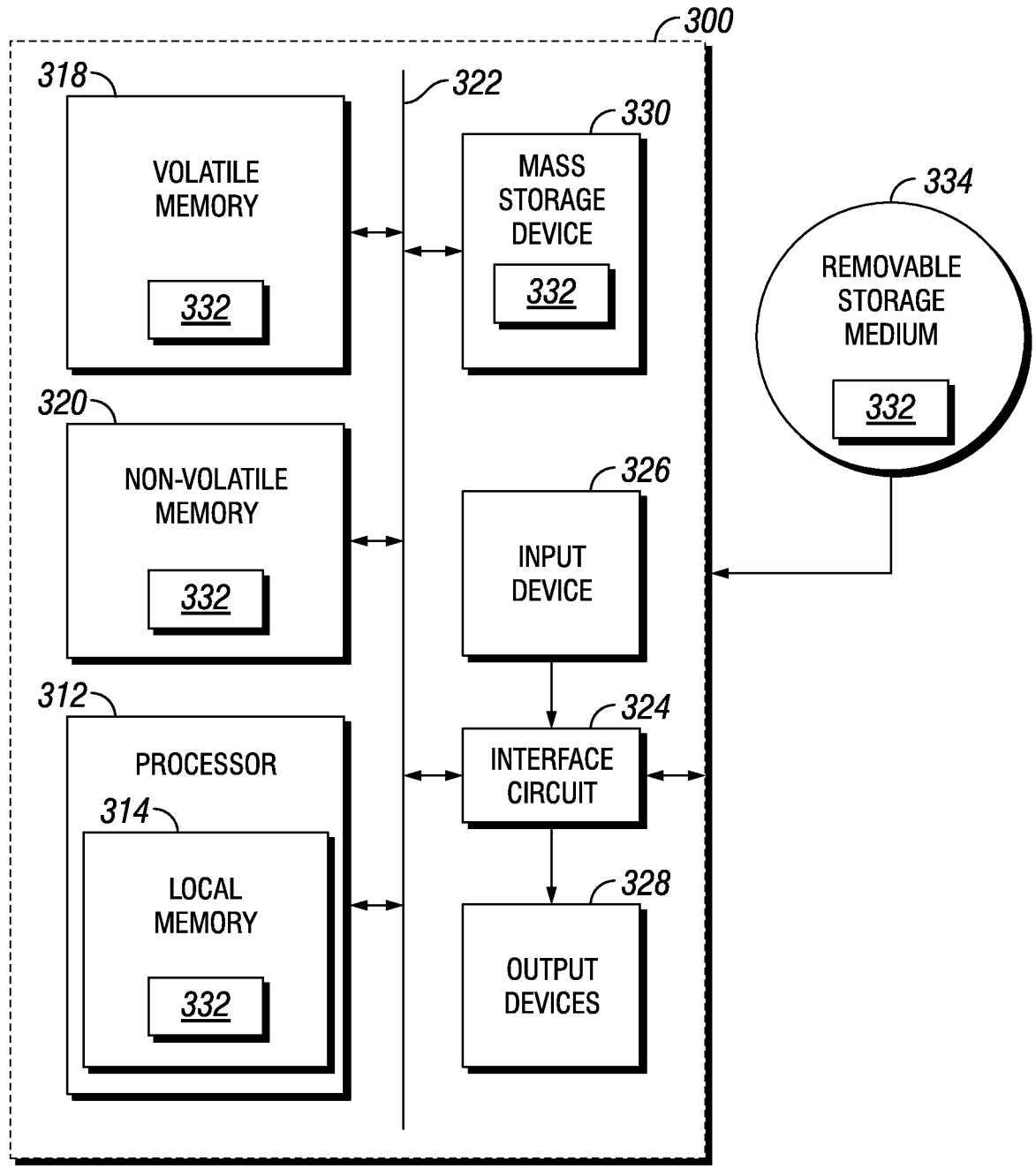
FIG. 3 is a schematic view of at least a portion of apparatus according to one or more aspects of the present disclosure.

FIG. 3 is a schematic view of at least a portion of apparatus according to one or more aspects of the present disclosure. The apparatus comprises a processing system 300 that may execute example machine-readable instructions to implement at least a portion of one or more of the methods and/or processes described herein, and/or to implement a portion of one or more of the example downhole tools described herein. The processing system 300 may be or comprise, for example, one or more processors, controllers, special-purpose computing devices, servers, personal computers, personal digital assistant ("PDA") devices, smartphones, internet appliances, and/or other types of computing devices. Moreover, while it is possible that the entirety of the processing system 300 shown in FIG. 3 is implemented within a downhole tool, such as the downhole tools and/or modules shown in one or more of FIGS. 1 and 2, it is also contemplated that one or more components or functions of the processing system 300 may be implemented in wellsite surface equipment, perhaps including the surface control equipment 106, 221 and/or other wellsite surface equipment depicted in FIGS. 1 and 2, and/or the downhole controller and/or control system 112, 270 shown in FIGS. 1 and 2.

The processing system 300 comprises a processor 312 such as, for example, a general-purpose programmable processor. The processor 312 comprises a local memory 314, and executes coded instructions 332 present in the local memory 314 and/or in another memory device. The processor 312 may execute, among other things, machine-readable instructions or programs to implement the methods and/or processes described herein. The programs stored in the local memory 314 may include program instructions or computer program code that, when executed by an associated processor, enable surface equipment and/or downhole controller and/or control system to perform tasks as described herein. The processor 312 may be, comprise, or be implemented by one or a plurality of processors of various types suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. Of course, other processors from other families are also appropriate.

The processor 312 is in communication with a main memory including a volatile memory 318 and a non-volatile memory 320 via a bus 322. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 320 may be, comprise, or be implemented by read only memory, flash memory and/or other types of memory devices. One or more memory controllers (not shown) may control access to the volatile memory 318 and/or the non-volatile memory 320.

The processing system 300 also comprises an interface circuit 324. The interface circuit 324 may be, comprise, or be implemented by various types of standard interfaces, such as an Ethernet interface, a universal serial bus (USB), a third generation input/output (3GIO) interface, a wireless interface, and/or a cellular interface, among others. The interface circuit 324 may also comprise a graphics driver card. The interface circuit 324 may also comprise a communication device such as a modem or network interface card to facilitate exchange of data with external computers via a network (e.g., Ethernet connection, digital subscriber line ("DSL"), telephone line, coaxial cable, cellular telephone system, satellite, etc.).

One or more input devices 326 are connected to the interface circuit 324. The input device(s) 326 permit a user to enter data and commands into the processor 312. The input device(s) 326 may be, comprise, or be implemented by, for example, a keyboard, a mouse, a touchscreen, a track-pad, a trackball, an isopoint, and/or a voice recognition system, among others.

One or more output devices 328 are also connected to the interface circuit 324. The output devices 328 may be, comprise, or be implemented by, for example, display devices (e.g., a liquid crystal display or cathode ray tube display (CRT), among others), printers, and/or speakers, among others.

The processing system 300 may also comprise one or more mass storage devices 330 for storing machine-readable instructions and data. Examples of such mass storage devices 330 comprise floppy disk drives, hard drive disks, compact disk (CD) drives, and digital versatile disk (DVD) drives, among others. The coded instructions 332 may be stored in the mass storage device 330, the volatile memory 318, the non-volatile memory 320, the local memory 314, and/or on a removable storage medium 334, such as a CD or DVD. Thus, the modules of the processing system 300 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure (e.g., non-transitory computer readable medium) embodying computer program code (i.e., software or firmware) thereon for execution by the processor.

FIG. 4 is a side view of at least a portion of apparatus according to one or more aspects of the present disclosure. The apparatus comprises a resistivity tool 400 of a downhole tool to determine a resistivity of a subterranean formation, such as may be included as at least a portion of the downhole tool 100 shown in FIG. 1 and/or the downhole tool 200 shown in FIG. 2. For example, the resistivity tool 400 may be coupled to, carried with or otherwise utilized in conjunction with a drill bit 410, such as may be akin to the drill bit 215 shown in FIG. 2.

The resistivity tool 400 implemented as a downhole tool 200 as described with respect to FIG. 2 comprises an electrode 430 operable to inject a current into surrounding fluid and the subterranean formation, a metallic collar 420 (e.g., a drill pipe as part of a BHA and/or drill string) operable as a current-return electrode, a guard electrode 450 that is held at potential analogous to a potential of the electrode 430 to reduce sensitivity to stray currents, and electrical insulators 440, 460, each associated with one of the electrode 430 and the guard electrode 450 that electrically decouple and/or insulate the electrode 430 and the guard electrode 450 from the rest of the downhole tool. The resistivity tool 400 is suspended in a wellbore 402 proximate a wall 404 of the wellbore 402 (generally with a standoff distance 406 from the wellbore wall 404) proximate the subterranean formation 408 where the measurements are to be taken. The wellbore 402 may be the wellbore 102 shown in FIG. 1 and/or the wellbore 211 shown in FIG. 2.

When the resistivity tool 400 is proximate the wall 404 of the wellbore 402, the electrode 430 may inject a measurement current into the surrounding fluid (not shown for clarity) in the wellbore 402 and the subterranean formation 408. The measurement current may then return to the metallic collar 420. A resulting impedance measurement is a ratio of a voltage applied to the electrode 430 divided by the measurement current that flows through the electrode 430 to the metallic collar 420. The voltage and measurement current may be provided by wellsite surface equipment such as the surface control equipment 106, 221 depicted in FIGS. 1 and 2, and/or the downhole controller and/or control system 112, 270 shown in FIGS. 1 and 2.

In the above-mentioned case, the resistivity tool 400 is implemented by a sensor of a logging while drilling (LWD) or measurement while drilling (MWD) tool (see, e.g., sensors 262 of the module 260 of the downhole tool 200 of FIG. 2). It may also be implemented, without limitation, by a sensor of a wireline downhole tool (see, e.g., sensors 122 of the downhole tool 100 of FIG. 1). It will be noted that other designs of the resistivity tool 400 may also be used according to the disclosure. For instance, the resistivity tool 400 may not comprise a guard electrode.

As introduced herein, an apparatus, system and method are described for providing or estimating a resistivity of the subterranean formation surrounding a wellbore employing a resistivity tool immersed in the wellbore when, for instance, a standoff distance between the resistivity tool system and a wall of the wellbore is not accurately known a priori. The fluid contribution to sensing resistivity of the surrounding subterranean formation is modeled by introducing a parallel impedance into a resistivity-sensing model. The contribution of the drilling fluid is especially important when the drilling fluid is oil-based. This leads to a non-linear method that employs a plurality of frequencies (and in particular at least three operating frequencies, three in this embodiment) to sense the resistivity of a surrounding subterranean formation and determine the standoff distance between the tool and a wall of the formation. A simulation may be used to validate this approach.

Oil-based drilling fluid (also referred to as "mud") acts like an electric insulator that is represented by a dielectric permittivity and a loss tangent, tan δ, expressed as a ratio of a formation conductivity $\sigma$ to a product of a formation dielectric permittivity $\varepsilon$ times a radian frequency $\omega$, as set forth below in Equation (1).

$$\tan\delta = \frac{\sigma}{\omega\varepsilon} \quad (1)$$

Even if there is dispersion of these quantities (e.g., variation over frequency), it is assumed herein that this dispersion is small over a frequency range of interest considered herein. This indicates that the frequency dependence of a mud impedance $Z_{mud}$ that models the mud in a wellbore, particularly at high frequencies, follows a law of the kind set forth below in Equation (2).

$$Z_{mud} = \frac{X_{mud}}{\omega} \quad (2)$$

where $X_{mud}$ is a given, complex, substantially constant number that captures the dielectric constant and loss tangent of the mud.

The complex equivalent formation impedance $Z_{form}$ of the subterranean formation surrounding a wellbore is sensed by immersing a resistivity tool in the wellbore and applying an AC power source between electrodes of the resistivity tool. The formation impedance $Z_{form}$ may be modeled by a resistor-capacitor parallel circuit as shown in FIG. 5, and is assumed to follow a dependency with respect to frequency variable described by Equation (3) set forth below.

$$Z_{form} = \frac{R_{form}}{1 + j \cdot C_{form}(\omega) \cdot \omega \cdot R_{form}} \quad (3)$$

wherein $C_{form}$ represents a formation capacitance produced by the formation permittivity $\varepsilon_{form}$, and $R_{form}$ represents a resistance of the subterranean formation produced by a formation resistivity $\rho_{form}$.

The response of the resistivity tool senses an apparent impedance $Z_{app}$ of the mud, and the surrounding subterranean formation can be interpreted as a physical impedance and can be modelled by a more complex equivalent circuit as illustrated in FIG. 6. The more complex equivalent circuit is formed as a first mud impedance $Z_{mud1}$ coupled in series with a measured impedance $Z_f$ representative of the formation impedance $Z_{form}$ and coupled in parallel with a second mud impedance $Z_{mud2}$, as illustrated by the equivalent circuit of the apparent impedance $Z_{app}$ shown in FIG. 6.

The circuit model illustrated in FIG. 6 comprises the measured impedance $Z_f$ representative of the formation impedance $Z_{form}$, and a first mud impedance $Z_{mud1}$ in series, and also a parallel second mud impedance $Z_{mud2}$. The enhanced circuit model effectively represents a current leakage that occurs as the standoff distance between electrodes of the resistivity tool and the subterranean formation increases. Some of the current paths measured by the resistivity tool are indeed not passing through the subterranean formation. They correspond to the electrical branch comprising the second mud impedance $Z_{mud2}$. Other currents are passing through the formation and the drilling fluid, which correspond to the electrical branches comprising the measured impedance $Z_f$ and the first mud impedance $Z_{mud1}$. This circuit model takes thus into account the standoff distance between the electrodes of the resistivity tool and the surrounding subterranean formation, which distance may not be accurately known and/or which may corrupt a resistivity estimate of the subterranean formation.

As set forth by Equation (2), the impedances may be approximated as follows:

$$Z_{mud1} = k_m^{\perp}(SO) \cdot X_{mud}/\omega \quad (4.1)$$

$$Z_{mud2} = k_m^{\parallel}(SO) \cdot X_{mud}/\omega \quad (4.2)$$

$$Z_f = k_f(SO) \cdot Z_{form} \quad (4.3),$$

wherein $k_m^{\perp}$, $k_m^{\parallel}$ and $k_f$ are potentially complex values representing geometrical factors of the formation that depend on stand-off (SO), $X_{mud}$ is representative of mud impedance and $Z_{form}$ is the impedance of the subterranean formation. From the equivalent circuit illustrated in FIG. 6, it can be shown that the apparent impedance $Z_{app}$ has a frequency dependency that can be represented by Equation (5) below:

$$Z_{app} = k_m^{\parallel} X_{mud}/\omega \frac{k_m^{\perp} X_{mud}/\omega + k_f Z_{form}}{(k_m^{\parallel} + k_m^{\perp}) X_{mud}/\omega + k_f Z_{form}} \quad (5)$$

This equation is derived from:

$$\frac{1}{Z_{app}} = \frac{1}{Z_{mud2}} + \frac{1}{Z_{mud1} + Z_{form}}$$

As it is seen from Equation (5), the apparent impedance function according to this model depends neither linearly on formation impedance nor linearly on frequency. This apparent impedance $Z_{app}$ may then be expressed as a rational model depending on the frequency as set forth below in Equations (6) and (7).

$$Z_{app} \cdot \omega = \frac{\alpha + \beta \cdot \omega}{1 + \gamma \cdot \omega} \quad (6)$$

$$Z_{app} = \left(\frac{1}{\omega}\right) \cdot \frac{\alpha + \beta \cdot \omega}{1 + \gamma \cdot \omega} \quad (7)$$

with $\alpha$, $\beta$, and $\gamma$ are complex parameters depending on the mud impedance and on the formation impedance $Z_{form}$ so that apparent impedance $Z_{app}$ is a non-linear function of formation impedance $Z_{form}$. $\alpha$, $\beta$ and $\gamma$ are computed to fit the measurements.

It is recognized that the term "1" in Equation (6) can be replaced with a fourth parameter that does not affect the net result, because dividing each term by the fourth parameter reproduces Equation (6).

The frequency dependency of the apparent impedance $Z_{app}$ can be generalized with more complex functions as the model becomes more elaborate, such as to take into account further parameters. One generalization is to increase the polynomial orders in both the numerator and the denominator of Equation (6), as set forth below in Equation (8).

$$Z_{app} \cdot \omega = \frac{\sum_{i=0}^{p} a_i \cdot \omega^i}{1 + \sum_{i=1}^{q} b_i \cdot \omega^i} \quad (8)$$

Equation (8) represents a more general electrical system response corresponding to another electrical model that can also be affected by propagation effects at high frequencies or by a varying geometrical factor for some resistivity contrasts between wellbore mud and the surrounding subterranean formation. Equation (8) comprises at least p+q+1 independent frequency measurements of the apparent impedance $Z_{app}$ to determine the complex parameters $a_i$, $b_i$. The apparent impedance function can also be represented by a non-polynomial form as regards its frequency dependency. As introduced herein, the representations can be employed and resolved in a similar manner. Whatever the chosen model is, at least one of the $a_i$ and $b_i$ coefficients depends on the formation impedance $Z_{form}$ so that the apparent impedance $Z_{app}$ is non linear relatively to the formation impedance $Z_{form}$.

An initial process of representing a formation impedance $Z_{form}$ with an equivalent circuit represented by Equation (4) and as illustrated by the circuit in FIG. 6 includes measuring the apparent impedance values $Z_{app1}$, $Z_{app2}$, $Z_{app3}$ at a plurality of frequencies (e.g., at three different frequencies $\omega 1$, $\omega 2$, $\omega 3$) by immersing the resistivity tool in the wellbore and applying an AC power source at the plurality of frequencies between electrodes of the resistivity tool. The apparent impedances values $Z_{app1}$, $Z_{app2}$, $Z_{app3}$ are measured by sensing voltages and currents at the plurality of frequencies. Measuring the apparent impedance values $Z_{app1}$, $Z_{app2}$, $Z_{app3}$ at the plurality of frequencies enables determining the three complex parameters $\alpha$, $\beta$, $\gamma$ of Equation (6). More operating frequencies (e.g., at least as many frequencies as the number of unknown parameters in the equation) can be utilized to estimate the parameters of Equation (8). It is noted that the unknown complex parameters, such as the three complex parameters $\alpha$, $\beta$, $\gamma$, are nonlinearly related to the measurements. It is also noted that when fewer number of operating frequencies are employed in the impedance measurements, then the three complex parameters $\alpha$, $\beta$, $\gamma$ (or the other complex parameters represented in equation (8)) can be estimated using a minimum mean square metric or other measure for their selection. However, results are more accurate when having at least as many frequency values (and corresponding apparent impedance values) as the number of the unknown parameters.

A further section of the process is to post-process formation impedance data produced by the resistivity tool (e.g., with surface equipment and/or downhole controller and/or control system), such as to produce the three complex parameters $\alpha$, $\beta$, $\gamma$, represented by Equation (6) or, equivalently, the more general series of complex parameters $a_i$ and $b_i$, represented by Equation (8).

An estimate of the formation resistivity $\rho_{form}$ of the surrounding subterranean formation can be produced by first considering a representation of the mud and the surrounding subterranean formation as the resistor-capacitor circuit illustrated in FIG. 5. The formation impedance $Z_{form}$ of the circuit illustrated in FIG. 5, as described previously hereinabove, is given by Equation (3).

Taking the partial derivative of the apparent impedance $Z_{app}$ multiplied by the radian frequency variable as in Equation (6) or (8) with respect to the radian frequency $\omega$, and then taking a limit as the radian frequency $\omega$ approaches zero, as illustrated below by Equation (9) set forth below, produces an estimate/approximation of the $Z_{form}$, the impedance of the subterranean formation, and correspondingly, its resistivity.

The expression as set forth in Equation (9) enables one to estimate the formation resistivity from the resistance of the formation $R_{form}$, which is equal to the formation impedance $Z_{form}$ when $\omega$ approaches 0 as is set forth by Equation (3). However, as the measurements may be disturbed by several parameters, it has been found that it may be more consistent to estimate the formation resistivity thanks to the modulus of the expression determined through Equation (9). In another embodiment, a real part of the expression determined through Equation (9) corresponds to the estimate of formation resistivity.

Producing a resistivity estimate for the subterranean formation can readily be related to the geometry of the resistivity tool employing techniques such as laboratory measurements and/or simulation. From Equations (6) and (9), an expression can be written in terms of the three complex parameters $\alpha$, $\beta$, $\gamma$, as set forth below in Expression (10).

$$\beta - \alpha \cdot \gamma \tag{10}$$

A magnitude (for instance, this expression, its modulus or real part as explained above) of Expression (10) represents a quantity employed for determining a resistivity of the subterranean formation.

An equivalent expression can be derived from Equation (8) and written in terms of the complex parameters $a_i$ and $b_i$, as set forth below in Expression (11).

$$a_1 - a_0 \cdot b_1 \tag{11}$$

A magnitude of Expression (11) represents a quantity employed for determining a resistivity of the subterranean formation. This approach can be also used for other higher-order family of parametrized functions.

Figure 7:
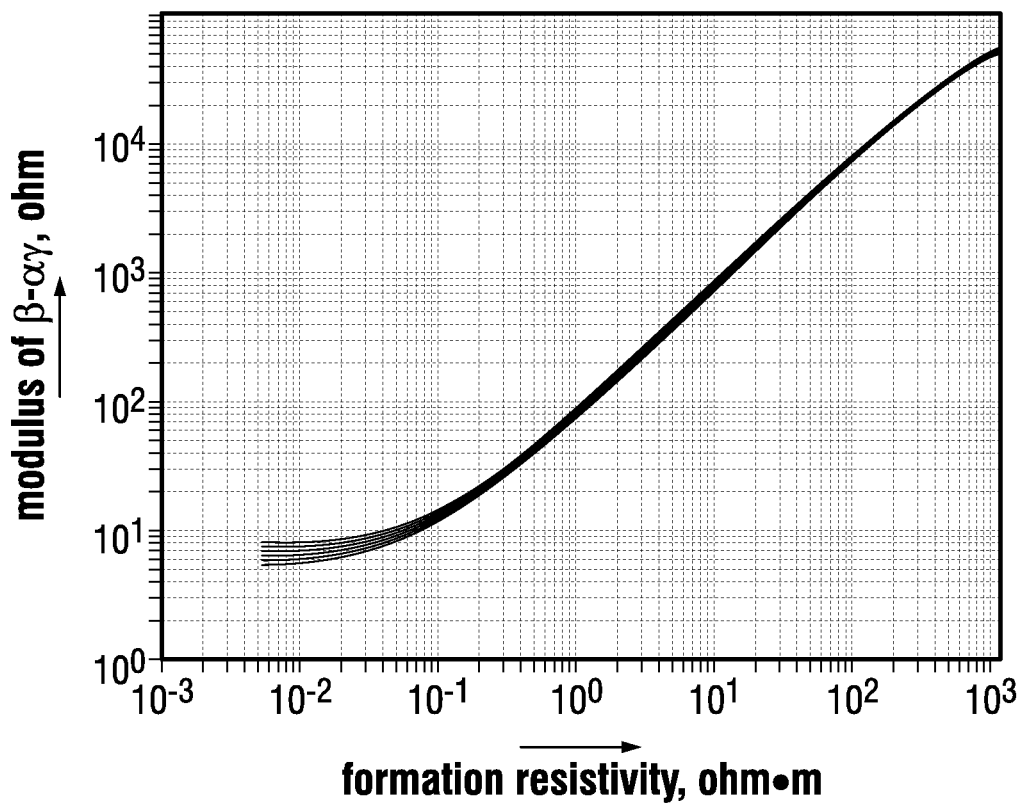
FIG. 7 is a graphical representation employed to estimate a resistivity of a subterranean formation according to one of more aspects of the present disclosure.

A numerical simulation of a resistivity tool was assembled and run for a range of formation resistivities spanning $10^{-2}$ to $10^3$ ohm·meters. A model employing Equation (6) to represent the apparent impedance $Z_{app}$ was simulated with three operating frequencies spanning the frequency interval [0.2, 400] megahertz ("MHz"). A graphical representation of a modulus of the expression $\beta - \alpha \cdot \gamma$ (i.e., the magnitude of the complex number $\beta - \alpha \cdot \gamma$) vs. formation resistivity $\rho_{form}$ is illustrated in FIG. 7. The graphical representation illustrates simulation results for different standoff distances and is based on a correlation between a formation dielectric constant and its resistivity. The modulus of the expression $\beta - \alpha \cdot \gamma$ illustrated in FIG. 7 spans a dynamic range of resistivity that extends over three orders of magnitude. As shown by the graphical representation of FIG. 7, a set of substantially overlying curves is produced, indicating that knowledge of the modulus of the expression $\beta - \alpha \cdot \gamma$ can be employed to make a reasonably accurate estimate of formation resistivity $\rho_{form}$ that is substantially independent of standoff distance between the electrodes of the resistivity tool and the wall of the wellbore.

An estimate of the stand-off distance between the sensor and a wall of the wellbore may also be produced via the model that is presented hereinabove in the circuit of FIG. 6. Indeed, when the capacitive behavior of the formation is not dominating the apparent impedance, the coefficient $\alpha$, also corresponding to a0, is independent from what happens in the formation and depends greatly from $k_m^\perp$ and $k_m^\parallel$ corresponding to geometrical factors that are dependent from the standoff. It is therefore a good expression for estimating the standoff. $\alpha$ may be obtained by using the following limit:

$$Z_{form} \propto \lim_{\omega \to 0} \left( \frac{\partial (Z_{app} \cdot \omega)}{\partial \omega} \right). \tag{9}$$

$$\lim_{\omega \to 0} (Z_{app} \cdot \omega).$$

Once the expression α or $a_0$ has been determined, standoff may be derived directly for the value of the expression. Indeed, a correlation between the standoff and the above-mentioned expression has been obtained through modelling and/or lab experiment that enables to determine the standoff distance. Such correlation function 905 is represented on the plot 900 of FIG. 9 showing in abscissa 902 the standoff and in ordinate 904 a corresponding value of the indicator α or $a_0$ (on a logarithmic scale). When it has been determined by the combination of the model and the measurements that the expression had the value 906, thanks to the correlation function, it can be directly determined that the standoff distance has the value 908.

The resistivity tool according to the disclosure rotates during the drilling of the wellbore and/or may comprise several sensors. Therefore, it is possible to obtain several standoff distance values at several azimuths for a predetermined depth of the wellbore. The resistivity tool 400 according to the disclosure may then be able to determine one or more parameters of the wellbore or the tool, such as the diameter or boundary of the wellbore, the trajectory or eccentricity of the tool, and may be used as a caliper tool. Therefore, the same measurement may be used for obtaining an image of the formation and information regarding the wellbore shape and size and/or position of the tool within the wellbore.

Figure 8:
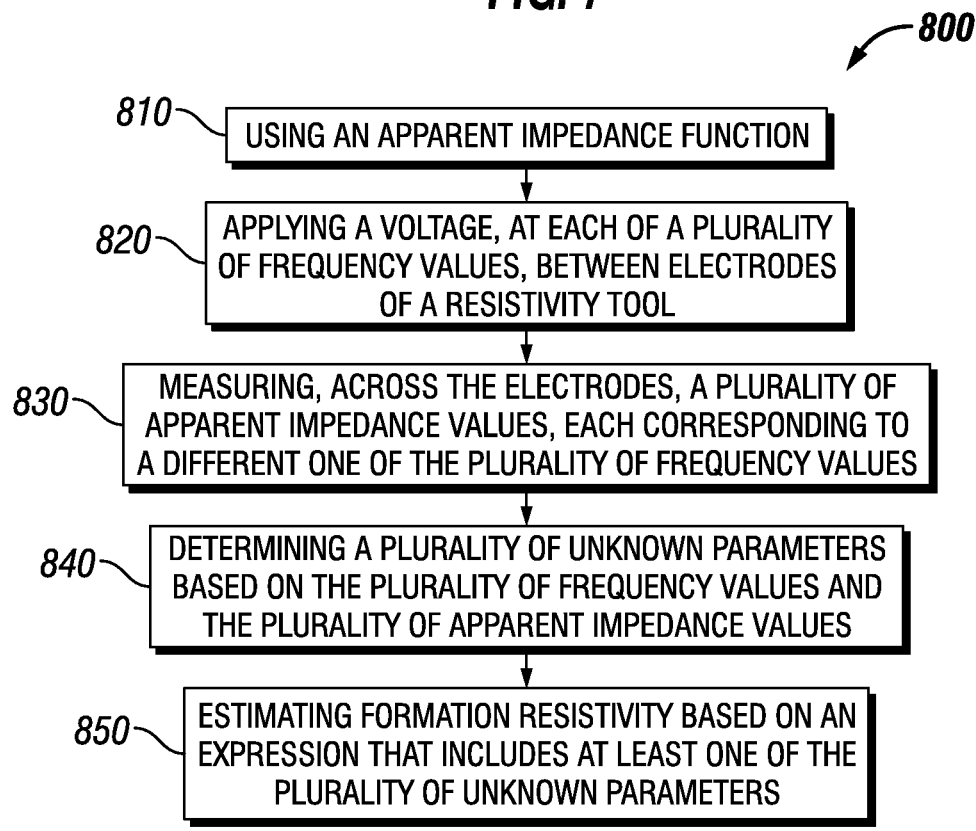
FIG. 8 is a flow-chart diagram of at least a portion of a method according to one or more aspects of the present disclosure.

FIG. 8 is a flow-chart diagram of at least a portion of a method (800) according to one or more aspects of the present disclosure. At least a portion of the method (800) may be executed by apparatus having one or more aspects in common with the apparatus shown in one or more of FIGS. 1-7 and/or other apparatus within the scope of the present disclosure. Thus, for example, one or more components of downhole apparatus, surface equipment, or a combination thereof may execute at least a portion of the method (800) within the scope of the present disclosure.

The method (800) for estimating a formation resistivity of a subterranean formation comprises using (810) an apparent impedance function $Z_{app}$ depending on a frequency variable ω and on a plurality of unknown parameters, at least one of the unknown parameters depending on a formation impedance $Z_{form}$ of the subterranean formation, so that the apparent impedance function $Z_{app}$ is non-linear relative to the formation impedance $Z_{form}$. The method (800) also comprises applying (820) a voltage, at each of a plurality of frequency values ω1, ω2, ω3, between electrodes of a resistivity tool that is disposed in a wellbore proximate the subterranean formation penetrated by the wellbore. The method (800) also comprises measuring (830), across the electrodes, a plurality of apparent impedance values $Z_{app1}$, $Z_{app2}$, $Z_{app3}$ each corresponding to a different one of the plurality of frequency values ω1, ω2, ω3. The method (800) still further comprises determining (840) the plurality of unknown parameters based on the plurality of frequency values ω1, ω2, ω3 and the plurality of apparent impedance values $Z_{app1}$, $Z_{app2}$, $Z_{app3}$. The method (800) also includes estimating (850) the formation resistivity based on an expression (second expression) that includes at least one of the plurality of unknown parameters.

In an embodiment, the expression is obtained by applying:

$$\lim_{\omega \to 0}\left(\frac{\partial(Z_{app}\cdot\omega)}{\partial\omega}\right),$$

wherein $Z_{app}$ is the apparent frequency function and ω is the frequency variable. The apparent impedance function $Z_{app}$ may be non-linear relative to the frequency variable ω. The plurality of apparent impedance values $Z_{app1}$, $Z_{app2}$, $Z_{app3}$ may comprise at least three apparent impedance values and the plurality of unknown parameters may comprise at least three unknown parameters.

The estimating (850) the formation resistivity may comprise determining a modulus of the expression and/or determining a real part of the expression. The estimating (850) the formation resistivity is substantially independent of a standoff distance between each of the electrodes and a wall of the wellbore, the apparent impedance function $Z_{app}$ taking into account a drilling fluid impedance circulating between the electrodes and the wall of the wellbore.

The measuring (830) the plurality of apparent impedance values $Z_{app1}$, $Z_{app2}$, $Z_{app3}$ may comprise sensing a ratio of the voltage to a corresponding one of a plurality of currents generated at the corresponding one of a plurality of frequency values ω1, ω2, ω3, each of the plurality of currents flowing along a corresponding one of a plurality of conductive paths between the electrodes. At least one of the plurality of conductive paths extends at least partially through oil-based drilling fluid in which the resistivity tool is at least partially submersed within the wellbore.

In an embodiment, the apparent impedance function $Z_{app}$ when multiplied by the frequency variable ω corresponds to a ratio of polynomials depending on the frequency variable ω and having the plurality of unknown parameters as coefficients, such as:

$$Z_{app}\cdot\omega = \frac{\sum_{i=0}^{p} a_i\cdot\omega^i}{1+\sum_{i=1}^{q} b_i\cdot\omega^i}$$

wherein $Z_{app}$ is the apparent frequency function, ω is the frequency variable, and $a_i$ and $b_i$ are the unknown parameters. In such a case, the expression is $a_1 - a_0\cdot b_1$. The unknown parameters are complex parameters.

The method (920) for estimating a standoff distance between the resistivity tool and a wall of the wellbore is shown on FIG. 10 will be described below. The common operations with the method (800) will have the same references. The method (920) comprises using (810) an apparent impedance function $Z_{app}$ depending on a frequency variable ω and on a plurality of unknown parameters, at least one of the unknown parameters depending on a formation impedance $Z_{form}$ of the subterranean formation, so that the apparent impedance function $Z_{app}$ is non-linear relative to the formation impedance $Z_{form}$. The method (920) also comprises applying (820) a voltage, at each of a plurality of frequency values ω1, ω2, ω3, between electrodes of a resistivity tool that is disposed in a wellbore proximate the subterranean formation penetrated by the wellbore. The method (920) also comprises measuring (830), across the electrodes, a plurality of apparent impedance values $Z_{app1}$, $Z_{app2}$, $Z_{app3}$ each corresponding to a different one of the plurality of frequency values ω1, ω2, ω3. The method (800) still further comprises determining (840) the plurality of unknown parameters based on the plurality of frequency values ω1, ω2, ω3 and the plurality of apparent impedance values $Z_{app1}$, $Z_{app2}$, $Z_{app3}$. The method (920) also includes estimating (930) a standoff distance between the resistivity tool and a wall of the wellbore based on an expression (first expression) that includes at least one of the plurality of unknown parameters.

In an embodiment, the apparent impedance function Zapp when multiplied by the frequency variable ω corresponds to a ratio of polynomials depending on the frequency variable ω and having the plurality of unknown parameters as coefficients, such as:

$$Z_{app} \cdot \omega = \frac{\sum_{i=0}^{p} a_i \cdot \omega^i}{1 + \sum_{i=1}^{q} b_i \cdot \omega^i}$$

The expression may be in this case in particular the coefficient $a_0$.

The expression may also be computed via the following expression:

$$\lim_{\omega \to 0} (Z_{app} \cdot \omega).$$

In an embodiment, the standoff distance is derived from the expression based on a correlation function between the expression and the standoff, as represented on FIG. 9. The correlation is determined via modelling and/or experimental setup.

The method (920) may also optionally comprise obtaining a plurality of standoff distance values at a plurality of azimuths within the wellbore by applying several times the above-mentioned operations. As discussed hereinabove, the values may be obtained by several sensors on the resistivity tools and/or at different times as the resistivity tools rotates within the wellbore during drilling. Indeed, the drilling of the wellbore is generally slow enough so that the tool is able to take several measurements essentially at the same depth. In the exemplary embodiment of the method of FIG. 10, the method includes associating (940) the standoff distance value with it azimuthal position and depth, which can be measured with well-known sensors such as magnetometers, and/or accelerometers and/or gyroscopes that are included in the tool. The measurement may be rather associated directly with depth and azimuthal position before the standoff distance is computed. It also includes changing the tool azimuth (950) and re-applying all of the above-mentioned operations for obtaining other standoff distance values at several azimuth. The method then comprises gathering (960) all of the standoff distance values taken at the same depth (for instance, when depth has substantially changed or in post-processing) and deriving (970) from all of the standoff distance values a parameter relative to the shape or size of the wellbore or to the position of the tool in the wellbore at said depth. Such parameter may be one or several of a diameter of a wellbore, a boundary of a wellbore, a trajectory of the tool or an eccentricity of the tool.

It is noted that both methods 800 and 920 may be performed simultaneously at least regarding the common operations 810-840. For instance, in an embodiment, the operations 820-830 may be performed downhole and the operations 810-840-850 as well as the operations 930-970 are performed at the surface. However, the operations 850 and 930 are performed based on the same measurements and on the same unknown parameter values, which enables to limit the computation time as well as the number of data transmitted to the surface via the telemetry system.

The present disclosure also introduces an apparatus for estimating a formation resistivity of a subterranean formation penetrated by a wellbore comprising a resistivity tool and a processing system. It also introduces an apparatus for estimating a standoff distance between the resistivity tool and a wall of the wellbore. The resistivity tool comprises external electrodes and operable within the wellbore to apply a voltage, at each of a plurality of frequency values ω1, ω2, ω3, between the electrodes, and measure, across the electrodes, a plurality of apparent impedance values $Z_{app1}$, $Z_{app2}$, $Z_{app3}$, each corresponding to a different one of the plurality of frequency values ω1, ω2, ω3. The at least one of the resistivity tool and the processing system is operable to use an apparent impedance function $Z_{app}$ depending on a frequency variable ω and on a plurality of unknown parameters, at least one of the unknown parameters depending on a formation impedance $Z_{form}$ of the subterranean formation, so that the apparent impedance function $Z_{app}$ is non-linear relatively to the formation impedance $Z_{form}$, determine the plurality of unknown parameters based on the plurality of frequency values ω1, ω2, ω3 and the plurality of apparent impedance values $Z_{app1}$, $Z_{app2}$, $Z_{app3}$, and estimate the formation resistivity based on an expression (second expression) that includes at least one of the plurality of unknown parameters. The processing system is further operable to estimate a standoff distance between the resistivity tool and wall of a wellbore based on a first expression that includes at least one of the plurality of unknown parameters The resistivity tool may comprise the processing system. Also, surface equipment disposed at a wellsite surface associated with the wellbore may comprise at least a portion of the processing system. The apparatus is adapted to estimate the formation resistivity and/or standoff distance includes one or more of the procedures as set forth above.

The present disclosure also introduces a computer program comprising machine-readable instructions for receiving a plurality of measured apparent impedance values (Zapp1, Zapp2, Zapp3) each corresponding to a different one of a plurality of frequency values (ω1, ω2, ω3) from a resistivity tool disposed in a wellbore penetrating a subterranean formation, and using an apparent impedance function $Z_{app}$ depending on a frequency variable ω and on a plurality of unknown parameters, at least one of the unknown parameters depending on a formation impedance $Z_{form}$ of the subterranean formation, so that the apparent impedance function $Z_{app}$ is non-linear relative to the formation impedance $Z_{form}$. On the basis of the plurality of measured apparent impedance values $Z_{app1}$, $Z_{app2}$, $Z_{app3}$ the computer program comprising machine-readable instructions determines the plurality of unknown parameters, and estimates the formation resistivity and/or standoff distance based on a second expression and/or first expression that includes at least one of the plurality of unknown parameters. The present disclosure also introduces a computer readable storage medium for storing the computer program.

The systems and methods introduced in the present disclosure are susceptible to various modifications, variations, and/or enhancements without departing from the scope of the present disclosure. For example, different configurations can be employed for the resistivity tool to accommodate a downhole tool or other challenging environment. Accordingly, the present disclosure expressly encompasses all such modifications, variations, and enhancements within its scope.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method for estimating a standoff distance between a wall of a wellbore penetrating in a subterranean formation and a resistivity tool disposed in the wellbore, comprising:
    using an apparent impedance function ($Z_{app}$) depending on a frequency variable (w) and on a plurality of unknown parameters, at least one of the unknown parameters depending on a formation impedance ($Z_{form}$) of the subterranean formation, so that the apparent impedance function ($Z_{app}$) is non-linear relative to the formation impedance ($Z_{form}$);
    applying a voltage, at each of a plurality of frequency values ($\omega 1, \omega 2, \omega 3$), between electrodes of the resistivity tool;
    measuring, across the electrodes, a plurality of apparent impedance values ($Z_{app1}, Z_{app2}, Z_{app3}$), each corresponding to a different one of the plurality of frequency values ($\omega 1, \omega 2, \omega 3$);
    determining the plurality of unknown parameters based on the plurality of frequency values ($\omega 1, \omega 2, \omega 3$) and the plurality of apparent impedance values ($Z_{app1}, Z_{app2}, Z_{app3}$), and
    estimating the standoff distance based on an expression that includes at least one of the plurality of unknown parameters, wherein measuring the plurality of apparent impedance values ($Z_{app1}, Z_{app2}, Z_{app3}$) comprises sensing a ratio of the voltage to a corresponding one of a plurality of currents generated at the corresponding one of a plurality of frequency values ($\omega 1, \omega 2, \omega 3$), each of the plurality of currents flowing along a corresponding one of a plurality of conductive paths between the electrodes.

2. The method of claim 1, wherein:
    the apparent impedance function ($Z_{app}$) when multiplied by the frequency variable ($\omega$) corresponds to a ratio of polynomials depending on the frequency variable ($\omega$) and having the plurality of unknown parameters as coefficients, such as:

$$Z_{app} \cdot \omega = \frac{\sum_{i=0}^{p} a_i \cdot \omega^i}{1 + \sum_{i=1}^{q} b_i \cdot \omega^i}$$

wherein Zapp is the apparent frequency function,
    $\omega$ is the frequency variable, and
    $a_i$ and $b_i$ are the unknown parameters.

3. The method of claim 2, wherein the expression corresponds to $a_0$.

4. The method of claim 1, further comprising deriving, from a plurality of standoff distances taken at a plurality of azimuths at a predetermined depth, a parameter relative to one of the shape of the wellbore, size of the wellbore and position of the tool in the wellbore at said predetermined depth.

5. The method of claim 4, wherein the parameter includes at least one of a diameter of a wellbore, a boundary of the wellbore, a trajectory of the tool or an eccentricity of the tool.

6. The method of claim 1, wherein the expression is a first expression, further comprising estimating a resistivity of the subterranean formation based on a second expression that includes at least one of the plurality of unknown parameters.

7. The method of claim 6, wherein the apparent impedance function ($Z_{app}$) when multiplied by the frequency variable ($\omega$) corresponds to a ratio of polynomials depending on the frequency variable ($\omega$) and having the plurality of unknown parameters as coefficients, such as:

$$Z_{app} \cdot \omega = \frac{\sum_{i=0}^{p} a_i \cdot \omega^i}{1 + \sum_{i=1}^{q} b_i \cdot \omega^i}$$

wherein Zapp is the apparent frequency function,
    $\omega$ is the frequency variable, and
    $a_i$ and $b_i$ are the unknown parameters, and the expression corresponds to $a_1 - a_0 \cdot b_1$.

8. The method of claim 1, wherein the expression is obtained by applying:

$$\lim_{\omega \to 0} (Z_{app} \cdot \omega),$$

wherein $Z_{app}$ is the apparent frequency function and co is the frequency variable.

9. The method of claim 1, wherein the apparent impedance function ($Z_{app}$) is a non-linear relative to the frequency variable (w).

10. The method of claim 1, wherein the plurality of apparent impedance values ($Z_{app1}, Z_{app2}, Z_{app3}$) comprises at least three apparent impedance values and the plurality of unknown parameters comprise at least three unknown parameters.

11. The method of claim 1, wherein at least one of the plurality of conductive paths extends at least partially through oil-based drilling fluid in which the resistivity tool is at least partially submersed within the wellbore.

12. The method of claim 1, wherein the unknown parameters are complex parameters.

13. The method of claim 1, wherein estimating the standoff distance based on the expression includes deriving the standoff from the expression and a correlation function between the expression and the standoff distance.

14. An apparatus for estimating a standoff distance between a wall of a wellbore penetrating in a subterranean formation and a downhole tool disposed in the wellbore, comprising:
    a resistivity tool included in the downhole tool and comprising external electrodes and operable within the wellbore to:

apply a voltage, at each of a plurality of frequency values ($\omega 1$, $\omega 2$, $\omega 3$), between the electrodes; and measure, across the electrodes, a plurality of apparent impedance values ($Z_{app1}$, $Z_{app2}$, $Z_{app3}$), each corresponding to a different one of the plurality of frequency values ($\omega 1$, $\omega 2$, $\omega 3$), wherein measuring the plurality of apparent impedance values ($Z_{app1}$, $Z_{app2}$, $Z_{app3}$) comprises sensing a ratio of the voltage to a corresponding one of a plurality of currents generated at the corresponding one of a plurality of frequency values ($\omega 1$, $\omega 2$, $\omega 3$), each of the plurality of currents flowing along a corresponding one of a plurality of conductive paths between the electrodes; and a processing system, wherein at least one of the resistivity tool and the processing system is operable to:

use an apparent impedance function ($Z_{app}$) depending on a frequency variable ($\omega$) and on a plurality of unknown parameters, at least one of the unknown parameters depending on a formation impedance ($Z_{form}$) of the subterranean formation, so that the apparent impedance function ($Z_{app}$) is non-linear relative to the formation impedance ($Z_{form}$), determine the plurality of unknown parameters based on the plurality of frequency values ($\omega 1$, $\omega 2$, $\omega 3$) and the plurality of apparent impedance values ($Z_{app1}$, $Z_{app2}$, $Z_{app3}$); and estimate the standoff distance based on an expression that includes at least one of the plurality of unknown parameters.

15. The apparatus of claim 14, wherein the resistivity tool further comprises the processing system.

16. The apparatus of claim 14, further comprising surface equipment disposed at a wellsite surface associated with the wellbore, wherein the surface equipment comprises at least a portion of the processing system.

17. The apparatus of claim 14, wherein the expression is a first expression, wherein the processing system is further operable to estimate a resistivity of the subterranean formation based on a second expression that includes at least one of the plurality of unknown parameters.

18. A computer program, comprising machine-readable instructions for:

receiving a plurality of measured apparent impedance values ($Z_{app1}$, $Z_{app2}$, $Z_{app3}$) each corresponding to a different one of a plurality of frequency values ($\omega 1$, $\omega 2$, $\omega 3$) from a resistivity tool disposed in a wellbore penetrating a subterranean formation, using an apparent impedance function ($Z_{app}$) depending on a frequency variable ($\omega$) and on a plurality of unknown parameters, at least one of the unknown parameters depending on a formation impedance ($Z_{form}$) of the subterranean formation, so that the apparent impedance function ($Z_{app}$) is non-linear relative to the formation impedance ($Z_{form}$), on the basis of a plurality of measured apparent impedance values ($Z_{app1}$, $Z_{app2}$, $Z_{app3}$) determining the plurality of unknown parameters;

estimating a standoff distance between based on an expression that includes at least one of the plurality of unknown parameters, wherein the apparent impedance function ($Z_{app}$) when multiplied by the frequency variable ($\omega$) corresponds to a ratio of polynomials depending on the frequency variable ($\omega$) and having the plurality of unknown parameters as coefficients, such as:

$$Z_{app} \cdot \omega = \frac{\sum_{i=0}^{p} a_i \cdot \omega^i}{1 + \sum_{i=1}^{q} b_i \cdot \omega^i}$$

wherein Zapp is the apparent frequency function,
$\omega$ is the frequency variable, and
$a_i$ and $b_i$ are the unknown parameters.

19. A computer readable storage medium storing the computer program of claim 18.

* * * * *